Aug. 10, 1965                N. PRITIKIN ETAL                3,200,326
RESISTANCE-CAPACITANCE DEVICE EMPLOYING CONDUCTIVE
AND NON CONDUCTIVE IRIDIZED OXIDE FILMS
Filed March 27, 1961
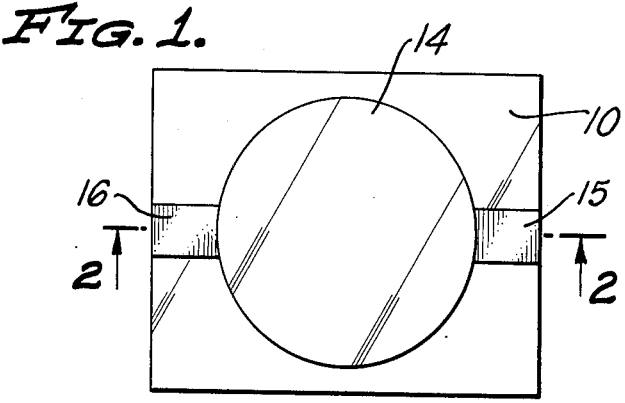
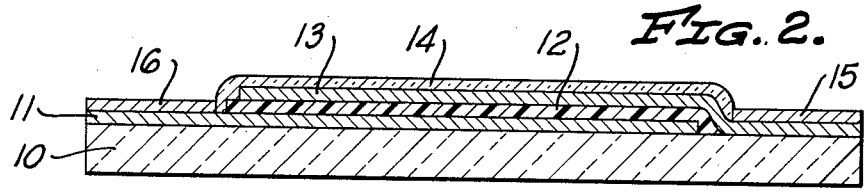
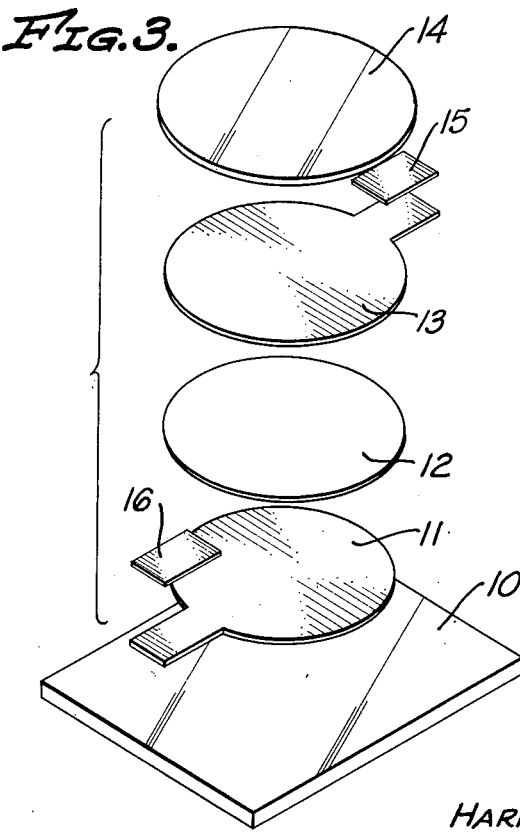
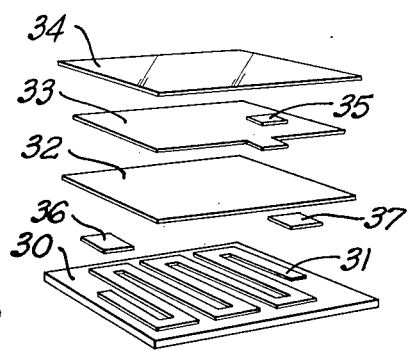
INVENTORS
NATHAN PRITIKIN,
BERNARD FELDMAN
BY THEIR ATTORNEYS
HARRIS, KIECH, RUSSELL & KERN United States Patent Office 3,200,326
Patented Aug. 10, 1965

3,200,326
RESISTANCE-CAPACITANCE DEVICE EMPLOYING CONDUCTIVE AND NON CONDUCTIVE IRIDIZED OXIDE FILMS
Nathan Pritikin, Santa Barbara, and Bernard Feldman, Ventura, Calif., assignors to Intellux Inc., Santa Barbara, Calif., a corporation of California
Filed Mar. 27, 1961, Ser. No. 98,548
3 Claims. (Cl. 323—74)

This invention relates to capacitors and to methods of making capacitors. The invention is particularly adapted for use with thin film capacitors suitable for printed circuit applications and for mass production of very small components. The invention is also suitable for use with distributed resistance-capacitance network elements.

Capacitors have been manufactured by vapor deposition of a film of dielectric material and such components are suitable for some applications. However, problems of stability under high temperature and high humidity conditions are encountered. Also, voltage breakdown and leakage have severely limited the use of this type of capacitor. The yield in production of capacitors with vapor deposited dielectric films is extremely low. Many problems are encounted including pinholes in the film and voltage breakdown of the finished capacitor.

It has been found that capacitors can be made using a nonconducting iridized metal oxide film as the dielectric between the capacitor plates and that such dielectric films can be made on a mass production basis with no pinhole problem. Accordingly, it is an object of the invention to provide a capacitor having a dielectric in the form of a nonconducting iridized metal oxide film.

It is another object of the invention to provide a capacitor comprising a plurality of layers including two conducting iridized metal oxide films spaced apart by a nonconducting iridized metal oxide film. A further object is to provide such a capacitor in which each plate comprises a conducting iridized metal oxide film with a metallic coating thereon.

It is an object of the invention to provide a capacitor comprising a plurality of layers of film on a substrate such as glass, including a first capacitor plate in the form of a conducting film, a nonconducting iridized metal oxide film on the first plate, and a second capacitor plate in the form of another conducting film on the nonconducting iridized film. Another object is to provide a capacitor in which the multilayer structure may have a continuous glass film applied thereover to seal the capacitor from the surrounding atmosphere.

It is an object of the invention to provide an integral resistance-capacitance network element and, in particular, one which will have a distributed resistance with respect to the capacitance. A further object is to provide resistance-capacitance network elements which may be in the form of three-terminal networks and in the form of networks of more than three terminals.

It is also an object of the invention to provide new and improved methods for making the capacitor of the invention.

Other objects, advantages, features and results of the invention will more fully appear in the course of the following description. The drawing merely shows and the description merely describes preferred embodiments of the present invention which are given by way of illustration or example.

In the drawings:
FIG. 1 is a plan view of a capacitor incorporating the invention;
FIG. 2 is a sectional view taken along the line 2—2 of FIG. 1;
FIG. 3 is an exploded view showing the capacitor of FIG. 1;

FIG. 4 is a diagrammatic illustration of a three-terminal network;
FIG. 5 is a diagrammatic representation of a four-terminal network; and
FIG. 6 is an exploded view showing a resistance-capacitance network element.

In the preferred form of the invention shown in the drawing, the capacitor includes a base or substrate 10, a capacitor plate 11, a dielectric film 12, another capacitor plate 13, and a glass seal 14 assembled in layers. Silver conducting segments 15, 16 may be applied to the capacitor plates to provide for soldering of wires to the capacitor. The thicknesses of the layers have been exaggerated in the drawing in order to clearly show the structure. Ordinarily, the substrate will be in the order of $\frac{1}{16}$ to $\frac{1}{8}$ inch thick while the layers applied thereto will be in the order of 500 to 10,000 A. Thicker layers may be used for higher operating voltages. The glass seal may be in the order of 0.003 inch thick.

The substrate 10 on which the succeeding layers are deposited ordinarily is an insulator or a conductor having an insulating coating thereon. Typically, substrates are formed of ceramics such as porcelain or glass and usually are selected to be mechanically strong and stable and to have electrical characteristics which do not affect the function of the capacitor. A typical substrate would be a sheet of Pyrex glass. Ordinarily, a large number of capacitors are formed simultaneously on a sheet of glass, after which the glass is cut into small sections to form the individual capacitors. In another mode of use of the invention, the capacitors may be formed as part of a circuit which is being built up on the substrate.

The capacitor plates are conductors and may be formed in various known manners such as by sputtering or vaporizing, by pyrolytic deposition of carbon or borocarbon, by fusing or plating of metallic film, by reduction of compounds to produce conductive films, and by iridizing, the latter technique being more fully described in U.S. Patent to Pritikin and Camp, No. 2,818,354, Electrical Resistor and Method of Making Same.

The glass seal 14 is not essential to the capacitor but is often applied to serve as a protective coating. Typically, the glass seal comprises a fused film of glass which gives both mechanical protection to the capacitor and isolation from the surrounding atmosphere. Several types of fused glass coatings are described in the aforesaid patent of Pritikin and Camp, No. 2,818,354. In one preferred method, a glass frit is mixed with a liquid carrier and the mixture is applied to the surface to be covered. The structure is then heated to a temperature to fuse the frit, forming a continuous film over the surface.

The dielectric film 12 is a nonconducting iridized metal oxide film. Iridized coatings of metal oxides are not new in film structures. Conducting iridized films are used in resistors, as described in the aforesaid patent of Pritikin and Camp. Nonconducting iridized films are also being used in thin film structures, as described in our copending application entitled Thin Film Structure and Method of Making Same, Serial No. 98,075, filed March 24, 1961, now Patent No. 3,134,689.

It has been found that the nonconducting iridized metal oxide films make excellent dielectrics for capacitors. Iridized metal oxide films have no pinholes therein. The film structures have been inspected utilizing electron microscopes but reveal no pinholes or minute breaks in the film. An occasional spot is produced in a film during manufacture, but such spots are easily noted by visual inspection and do not cause any problem. The reason for the pinhole-free structure is not fully understood but one possible explanation is given subsequently herein.

Various metals are used in producing iridized metal oxide coatings. Tin, indium, cadmium, and various combinations of these three, with or without small additional quantities of zinc, iron, copper, magnesium, cobalt, vanadium and antimony are used in conducting coatings. Antimony and iron are used in nonconducting iridized metal oxide coatings. It should be noted that while antimony and tin are used in combination to form a conducting film, the antimony by itself produces a nonconducting iridized film.

Iridized metal oxide films are generally produced by mixing a salt of the desired metal in a liquid carrier and spraying this mixture onto a heated substrate. The resulting iridized coatings are generally accepted as being formed primarily of the metal oxide, although there is some difference of opinion as to the exact composition. For the purposes of this application, films of this type are referred to herein as "iridized coatings of metal oxides" or "iridized metal oxide films." These expressions are intended merely to indicate the general type of coating and are not to be considered as being limited to any particular molecular arrangement or configuration.

It is felt by some parties that these "iridized metal oxide films" contain the metal and oxygen elements in an arrangement which does not constitute a true oxide of metal. Other parties contend that these coatings are partially metal oxides and partially metal in a pure state or in combination with other elements. Accordingly, the expressions are intended to include this general type of coating regardless of whether the coating is actually a proper metal oxide, speaking in strict chemical terms.

A conducting iridized tin oxide film may be made as follows: a solution of stannic chloride in alcohol is prepared comprising 100 grams stannic chloride and 50 cc. methanol. The substrate in the form of a sheet of Pyrex glass is heated to 1150° F. in an oven and immediately upon removal from the oven is sprayed with a coat of the aforesaid solution. The iridized metal oxide film is formed at the heated surface of the substrate and on cooling, the coated substrate is ready for subsequent operation. The resulting iridized films are ordinarily in the range of 500 to 10,000 A. thick, with the presently preferred thickness for capacitors being in the order of 5,000 A.

The nonconducting iridized antimony oxide film may be produced by following the above process utilizing a solution of antimony pentachloride in alcohol. Such a solution may comprise 51 cc. $Sb_2Cl_5$ and 240 cc. methanol. A nonconducting iridized iron oxide film may be produced utilizing a solution of ferric chloride. Such a solution may comprise 95 grams of $FeCl_3$ in 525 cc. of methanol.

The terminals 15, 16 are conventional in nature. Typically a terminal is applied in the form of a paste of glass frit and metallic silver which is fused in place to provide a silver conductor suitable for soldering.

The following steps may be followed in fabricating the capacitor shown in the drawing. The glass substrate is heated and then sprayed with a stannic chloride solution to form a conducting iridized metal oxide film to serve as the capacitor plate 11. The film may then be etched as by a photochemical process to provide the particular shape desired. This etching process is conventional in nature and includes the following steps. First the film to be etched is covered with a layer of photosensitive material. After drying, the structure is exposed to light through a suitable mask and then developed to remove all of the photosensitive material that has not been exposed. The remaining exposed portions of the photosensitive material are set, as by heating to an elevated temperature, after which the portions of the iridized film not protected by the set material are removed by etching. Then the set photosensitive material is removed and the photochemical etching process is complete.

In the next step, the area of the plate 11 to which the connector 16 is to be applied and the exposed substrate 10, except for a rim around the plate 11, are masked. Typically, the masking may comprise an inorganic inert material such as titanium dioxide powder in pine oil. This material in paste or liquid form is applied to the structure through a mask by printing or spraying. Then the dielectric film in the form of a nonconducting iridized metal oxide film is applied as described above. The heating prior to spraying serves to drive off the pine oil or other carrier from the masking material leaving a dry powder mask in position during the spraying step. After the iridized dielectric film has been applied, the powdered titanium dioxide may be brushed away taking the newly deposited iridized film with it and exposing the terminal area thereunder. Ordinarily, the dielectric film is made slightly larger than the capacitor plate to prevent voltage breakdown by fringing effects.

The terminal area of the capacitor plate 11 and the exposed substrate 10, including the rim of the dielectric film 12, are again masked and the conducting iridized metal oxide film for the second capacitor plate is applied.

If desired, the protective glass seal 14 may be produced by applying the glass frit in paste form through a mask or silk screen to cover the capacitor, after which the structure is fired to fuse the glass to a continuous cover. The connectors 15, 16 may be applied by printing the silver-glass paste through an appropriate mask followed by firing. Both the glass seal 14 and the connectors 15, 16 can be fired at one time if desired. Variations in the masking and etching steps may be made as desired. For example, one or more of the films may be placed over the entire substrate and left intact or etched to a particular configuration. The method may be used to form a single capacitor or a plurality may be made at one time on a single substrate.

Capacitors formed by this method using an iridized antimony oxide film in the order of 5,000 A. thick as the dielectric have a capacitance of about 0.01 microfarad per square centimeter and will withstand a 50 volt breakdown test. The yield in manufacture of such capacitors is nearly 100 percent, since there are no rejects for voltage breakdown due to pinholes.

In explaining the reason for absence of pinholes, it is noted that all organic particles are burned off of the lower capacitor plate during the preheating step. When the hot plate is removed from the oven, the salt solution is sprayed toward the plate using air under pressure. The solution tends to vaporize during the spraying. It is thought that when the vapor gets very close to the heated plate, the liquid goes into the gaseous state and creates strong convection currents of gas which sweep the surface of the plate and remove inorganic particles therefrom. While this action is difficult to observe, it is felt that the absence of pinholes may be due to the strong scouring effect produced by the motion of the hot gas. It is also thought that the heating of the substrate for application of the iridized film causes the substrate to lose its static charge permitting the inorganic particles to fall away. Regardless of the reason, it is clear that the resultant iridized metal oxide film is free of minute pinholes and has a high dielectric strength.

When conducting iridized metal oxide films are used as the capacitor plates, it is sometimes desired to increase the conductivity of the plates by providing metallic coatings thereon. These metallic coatings are quite thin and may be applied by using known techniques. For example, a flash plating of gold or other metal may be applied to the iridized metal oxide film. Ordinarily, the metallic film will be applied to the upper surface of the lower capacitor plate 11 and to the upper surface of the dielectric film 12 to provide maximum conduction at the surfaces of the dielectric. In alternative forms, a metal resinate solution may be printed or sprayed onto the iridized film, with the resinate solution being reduced to a metal film in the next heating step, or a metal resinate can be used to form the entire capacitor plate, or the capacitor plate may be a fused silver layer. It should be noted that the invention is not limited to the use of a multilayer structure on an insulating substrate and that, for example, one capacitor plate may serve as the support in the form of a metal plate with the dielectric film applied directly thereto. Also, in some applications it may be desirable to provide an isolation layer between the substrate and the lower capacitor plate in the form of a nonconducting iridized metal oxide film to eliminate adverse effects on the capacitor plate due to characteristics of the substrate, as more fully described in my aforesaid copending application.

The capacitor of the invention may be used in electrical circuits as a conventional two-terminal capacitor. The capacitor also can be used in resistance-capacitance network elements and is especially advantageous in that it provides a distributed resistance-capacitance network, which is desired in many circuit applications. In forming a three-terminal resistance-capacitance network element such as is shown in FIG. 4, one of the capacitor plates is used as a resistor providing two terminals of the network element while the other capacitor plate provides the third terminal. In a four-terminal network as shown in FIG. 5, each of the capacitor plates is used as a resistor to provide two terminals of the network.

Ordinarily, a rectangular or circular type of capacitor plate, such as is shown in FIGS. 1 and 3, will not have sufficient resistance between opposing edges thereof for use in a resistance-capacitance network. Therefore, it is preferred to configurate one or both of the capacitor plates in a serpentine or other shape to develop the desired value of resistance. Typical film-type configurated resistors are shown in the U.S. patents to Kerridge et al., No. 2,693,023, Pritikin, No. 2,849,583 and Tellkamp, No. 2,953,764.

A typical three-terminal distributed resistance-capacitance network element is shown in FIG. 6. The element includes a base or substrate 30, a capacitor plate 31, a dielectric film 32, another capacitor plate 33, and a glass seal 34 assembled in layers in the same manner as discussed in conjunction with FIGS. 1–3. One of the capacitor plates, here the plate 31, is formed into a serpentine configuration, as by the conventional photoetching process. When a four-terminal network is desired, the other capacitor plate will also be formed into a suitable configuration to provide the desired resistance value. It should be noted that in a four-terminal network, the value of resistance of each plate may be different. A silver conducting segment 35 may be applied to the capacitor plate 33 to serve as one terminal. Similar silver conducting segments 36, 37 may be applied to opposing ends of the serpentine-shaped plate 31 to serve as terminals.

As indicated above, the glass seal 34 is desirable for protecting the network element but is not essential to the invention. The films used in forming the capacitor plates and the dielectric may have various compositions, the iridized metal oxide films described above being preferred.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

We claim as our invention:

1. A nonpolarized three-terminal resistance-capacitance network element comprising a plurality of layers including first and second conducting iridized metal oxide films spaced apart by a nonconducting iridized metal oxide film dielectric, with said first conducting film in the form of a resistor providing two terminals of said element and with said second conducting film providing the third terminal.

2. A nonpolarized four-terminal resistance-capacitance network element comprising a plurality of layers including two conducting iridized metal oxide films in the form of resistors spaced apart by a nonconducting iridized metal oxide film dielectric, with each of said conducting films providing two terminals of said element.

3. A nonpolarized capacitor comprising a plurality of layers of film on a substrate, the layers including in sequence:
a conducting iridized metal oxide film;
a metallic film;
a nonconducting iridized metal oxide film dielectric;
a second metallic film;
a second conducting iridized metal oxide film; and a continuous glass film.

References Cited by the Examiner
UNITED STATES PATENTS

| | | | |
|---|---|---|---|
| 2,111,710 | 3/38 | Van Loon | 317—256 |
| 2,518,225 | 8/50 | Dorst | 323—74 |
| 2,611,094 | 9/52 | Rex | 317—258 X |
| 2,617,741 | 11/52 | Lytle | 117—215 |
| 2,619,443 | 11/52 | Robinson | 317—261 X |
| 2,648,753 | 8/53 | Lytle | 117—217 |
| 2,818,354 | 12/57 | Pritikin et al. | 117—70 X |
| 2,892,139 | 6/59 | Salzberg | 317—258 |
| 2,927,048 | 3/60 | Pritikin | 117—215 |
| 2,934,736 | 4/60 | Davis | 338—308 |
| 3,029,370 | 4/62 | Hill | 317—258 |
| 3,134,689 | 5/64 | Pritikin et al. | 117—212 |

FOREIGN PATENTS 857,885   1/61   Great Britain.

OTHER REFERENCES

Application Ser. No. 98,075, filed March 27, 1961.

LLOYD McCOLLUM, *Primary Examiner.*

ORIS L. RADER, *Examiner.*